Figure 1:
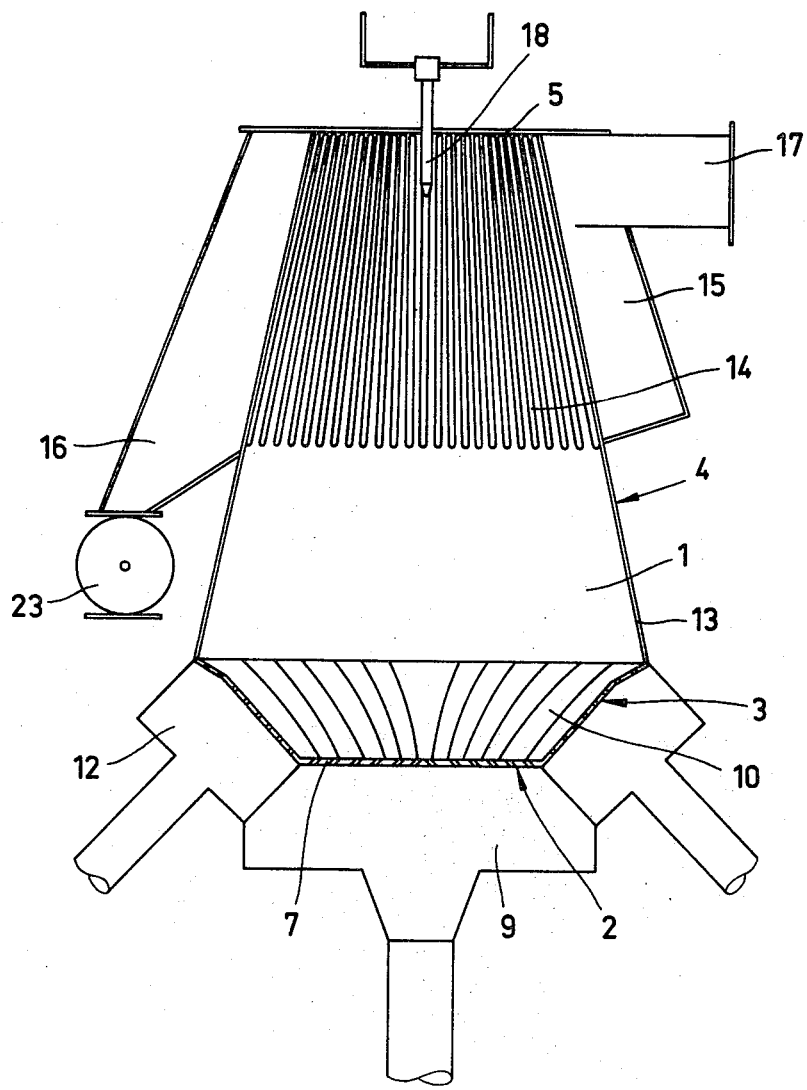

United States Patent [19]
Hereth

[11] 3,817,696
[45] June 18, 1974

[54] METHOD OF AND APPARATUS FOR FLUIDIZED BED TREATMENT OF SOLIDS OR LIQUIDS

[76] Inventor: Horst Hereth, Ludwig-Thoma-Strasse 36, 8031 Puchheim, Germany

[22] Filed: Aug. 9, 1972

[21] Appl. No.: 279,284

[52] U.S. Cl............ 432/15, 34/10, 34/57 E, 432/58
[51] Int. Cl. .... F27b 15/10, F26b 3/08, F26b 17/00
[58] Field of Search............ 34/10, 57 E; 432/15, 58

[56] References Cited
UNITED STATES PATENTS

| | | | |
|---|---|---|---|
| 2,058,218 | 10/1936 | Duccini et al.................. | 34/57 R X |
| 2,100,907 | 11/1937 | McGhee et al..................... | 432/58 |
| 3,405,454 | 10/1968 | Zeff........................................ | 34/10 |
| 3,566,582 | 3/1971 | Yankura................................ | 55/92 |

*Primary Examiner*—John J. Camby
*Attorney, Agent, or Firm*—Kenyon & Kenyon Reilly Carr & Chapin

[57] ABSTRACT

The apparatus is constructed so that the carrier medium is fed into the upwardly flaring member at an angle to form a fluidized bed having a sharply defined depression or dip in the center. The lower pressure in the depression produces a reverse flow in a downward direction so that skeins from the fluidized bed may be returned into the bed without being directly removed from the furnace.

11 Claims, 5 Drawing Figures

METHOD OF AND APPARATUS FOR FLUIDIZED BED TREATMENT OF SOLIDS OR LIQUIDS

This invention relates to a method of and an apparatus for the fluidized bed treatment of solids or liquids for carrying out roasting or calcining processes, pyrolyses, burnings, reductions and drying or granulating processes.

It is known to carry out such processes in fluidized bed plants the furnace of which is of the cylindrical or rectangular trough-like type. In such cases, the carrier medium, namely air, gas, hot air or hot gas is usually introduced into the furnace through a bottom provided with vertical bores or — in the case of the trough-like type — through a bottom having transverse bores directed in the direction of flow of the goods, the produced bed or the material to be treated is placed into turbulence, and the carrier medium together with the final product is discharged at the furnace head. The grain size of the goods treated in fluidized bed plants of this type is downwards limited to about 100 microns, since in the case of finer material a uniform fluidized bed can no longer be formed because of channel formation.

When liquids or solutions are to be treated, they are introduced into the fluidized bed from above by unary or binary nozzle means. In such a case, frequently wall cakings or sintering of the fluidized bed occur by reason of the widening of the jetting cone because of the upward flow of the carrier medium or unsatisfactory quality of the jetting. In burning operations in known fluidized bed plants, frequently only a bad intermixing of the burning gas — which is mostly introduced laterally over the fluidized bed — with the air of the fluidized bed, and a short critical or residence time of the gas is achieved. This leads often to after-burnings outside of the fluidized bed and hence to greatly elevated head temperatures of the combustion chamber.

It is furthermore known to subject fine-grained goods having a grain size of less than 100 microns both as finely jetted liquid and as solids to the above-mentioned processes in high turbulence reactors or in rotary flow dryers. However, the applicability of high turbulence reactors is restricted by the fact that the residence time of the goods is extremely short and cannot be varied. This requires superheated gas temperatures lying far above the actual reaction temperature of the process concerned, which can be detrimental to temperature-sensitive products and accounts for the low utilization of the heat. In addition, the produced flow conditions are frequently very unstable. On the other hand, in the case of rotary flow dryers the feed of liquids and solutions is not possible and their use is limited to relatively low temperatures (maximum 600°C.).

The moreover also known so-called spray roasters or spray dryers have lower heat and material transfer coefficients relative to fluidized bed plants, which leads to considerably greater dimensions of the apparatus while the output remains the same.

In the case of roasting fine-grained sulfidic ores in a fluidized bed plant it is known that for forming an appreciable counterflow effect in the fluidized bed between the ascending gas stream and the goods falling against said gas stream and withdrawn at the bottom portion, the roasting air is injected or sucked in from the bottom through a rotatable gas distributing device so as to enter the furnace space in upwardly inclined direction and tangentially to the imaginary cylinder jackets disposed concentrically to the furnace space. By slow rotation of the distribution device the goods form a rotating fluidized bed with whirls revolving in the horizontal. The intermixing in the vertical direction is considerably decreased as against the usual fluidized bed. Yet in this way, a distribution of the introduced goods takes place merely on the bed surface. In exothermic processes this leads to unfavourable overheating of the furnace head while simultaneously the lower bed region "freezes in". And not the total bed serves as a heat carrier, but only a portion of the same, which considerably decreases the heat utilization. On the other hand, in endothermic processes the introduced goods are not brought directly in contact with the hot gas effluent from the vortex bottom, whereby, too, the efficiency of the heat exchange is influenced negatively. Furthermore, the distribution of the solids cannot be influenced by the merely upwardly inclined rotating gas strands so that the not yet roasted material can contact the walls and thus lead to caking thereon. Moreover the vortex bottom rotates in a not fluidized bed of roasted goods, thus leading to high wear and to decrease of the working safety of the apparatus.

The problem underlying the invention is to provide a method for the fluidized bed treatment of solids or liquids in a chamber with the aid of a carrier medium while feeding the goods from the top and the carrier medium from the bottom into the chamber and producing an upward rotatory flow of the carrier medium, thus permitting to achieve high material and heat transfer coefficients, sufficient sojourn times, accurate controllability of the process temperature and optimum heat balance yet reliably avoiding cakings on the walls of the chamber as well as superheating or supercooling zones, while also providing a simple, long wearing apparatus for carrying out the method.

According to the invention, this problem is solved in that the carrier medium is placed into a upward rotational flow producing a strongly pronounced vortex subsidence of the surface of the fluidized bed which encloses a central region of low pressure, so that said carrier medium is discharged together with the final product in a manner known per se above the fluidized bed.

The advantage of such a sharply defined vortex hollow in the fluidized bed consists in particular in that in the central region of low pressure there is formed a back-flow downwardly, which not only takes the goods fed in from the top, but is in particular also supplied with detachments from the fluidized bed. Namely, between this reverse flow and the rotating upward flow in the fluidized bed there is formed a region of higher turbulence in that strands detached from the fluidized bed are continuously fed back into the reverse flow toward the center of the fluidized bed.

By feeding the goods from the top into the chamber it is ensured that the charged goods get directly into the back-flow formed in the region of the chamber axis. Hence it cannot be entrained by the upward flow and thrown against the walls of the chamber until the desired process has not progressed at least so far that cakings do not occur. The jetting cone is not beat out but practically tied up by the back-flow, and the goods are passed into proximity with the bottom of the fluidized bed. On the way to said bottom, a pretreatment, for example a drying-up of the goods — whereby the major part of the humidity is evaporated — takes place by reason of the detachments added continuously from the fluidized bed, so that mostly only the heat amount still required for carrying out the reaction is withdrawn from the fluidized bed. In the vicinity of the fluidized bed bottom, the goods are engaged by the carrier medium effluent from the chamber bottom and are entrained in its flow extending helically upwardly. As already mentioned, strands or skeins are continuously detached from said upward flow now in the highly turbulent boundary range to the reverse flow and enter the reverse flow. In this manner the goods, before being carried out above the fluidized bed, can several times enter the back-flow from the spiral-like upward flow whereby achieving a thorough intermixing and sufficient sojourn times, which in turn ensure a complete run of the desired process within the fluidized bed and the back-flow as well as high material and heat transfer coefficients. The after-burnings outside of the fluidized bed, which are undesirable in burning operations, and supercoolings in the range of the entrance of the carrier medium into the chamber cannot occur.

The guidance of the goods and of the carrier medium according to the invention provides the possibility of exact temperature control along with an optimal uniform treatment of the goods. Thanks to the thorough mixing and to the good utilization of the heat, the individual processes can be carried out without great enthalpy difference, whereby e.g. a very careful drying of temperature-sensible products is possible.

In an apparatus consisting of an upright furnace of round cross section including a bottom serving as inlet means for the carrier medium and imparting the rotational flow thereof, and inlet means arranged at the upper end for the goods to be treated, the rotational upward flow according to the present invention is achievable in that the furnace chamber has a fixed vortex bottom having bores arranged inclined, and in that for the withdrawal of the carrier medium together with the final product the upper range of the furnace chamber jacket is formed as outlet means. Due to the fact that no rotating members or, as the case may be, no rotating members flowed through by hot gases at high temperature are provided by the inclined position of the bores of said bottom produces the rotational upward flow of the carrier medium, and that the solids are discharged in the chamber head, an optimum safety of operation and wear-resistance are ensured.

A plurality of bores are provided in an advantageous manner, which are arranged on a plurality of imaginary concentric circles and which extend through the horizontal bottom tangentially or by up to 45° relative to the centerpoint of said bottom with an inclination of 10–80° to the plane of said bottom.

In a special embodiment of the invention, a two-part, separately chargeable vortex bottom of the furnace chamber is provided, which represents the surface area and base area of a conic frustum which is upwardly flaring. In this manner, two carrier media of different kind can be charged into the furnace chamber so that such a furnace is universally utilizable.

The vortex bottom portion representing the surface area or jacket of the conic frustum is then preferably formed of a plurality of sheet metal strips which are arranged in overlapped and spaced apart relationship and which are substantially disposed on cone generating lines, while slots formed between adjacent sheet metal strips are formed as nozzle rows — with the aid of spacers — to the substantially tangential, obliquely upwardly directed inlet of the carrier medium into the furnace chamber. In such an outer vortex bottom ring for producing a rotational upward flow it is more favourable in many cases to provide the central lower portion of the bottom with a plurality of bores extending vertically through the bottom. Due to the initially pure upward flow of the carrier medium flowing from said portion of the bottom and to the intense outer rotational flow and in conjunction with the reverse flow in the central region of lower pressure, a zone of particularly high turbulence is formed which further enhances the material and heat exchange.

Yet in addition to the outer vortex bottom ring, in particular also the inner bottom can be provided with a plurality of inclined or transverse bores to thereby produce a rotational upward flow. In this manner, the entire fluidized bed is set rotating, which leads to a particularly strong reverse flow.

The undesirable cakings at the walls are avoided in a most reliable way in that the inlet means for the goods to be treated is arranged in a manner known per se centrally in the head portion of the furnace chamber.

A good utilization of the heat is ensured in that the outlet means in the upper region of the furnace chamber jacket is formed as heat exchange register while the furnace chamber jacket in the range of the fluidized bed is formed as double jacket having annular guides for gas preheating.

The furnace chamber jacket is advantageously formed in the shape of an upwardly converging frusto-conical jacket.

Figure 2:
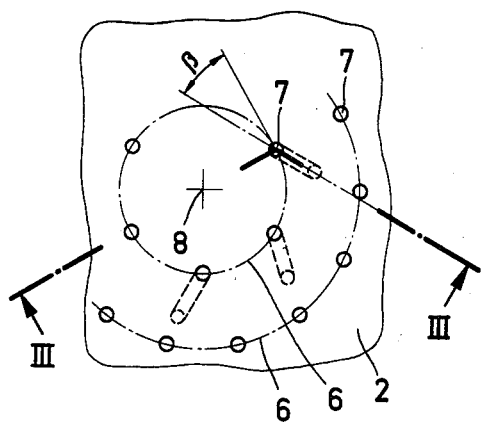
Figure 3:
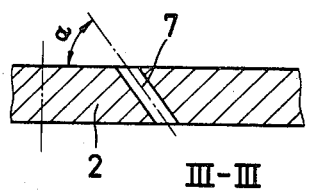
Figure 4:
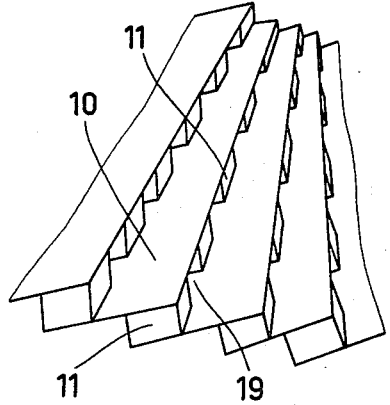
Figure 5:
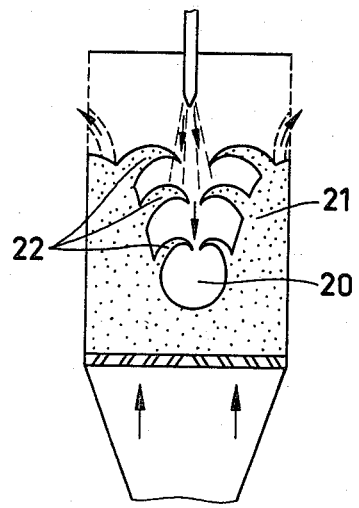

The invention will be elucidated hereinafter in greater detail with reference to the drawings, in which FIG. 1 shows a furnace in section for carrying out the method according to the invention, FIG. 2 shows a partial top plan view of the lower portion of the vortex bottom of the furnace chamber, FIG. 3 shows the section III—III in FIG. 2, FIG. 4 shows a perspective partial view of the frusto-conically shaped vortex bottom of the furnace chamber, and FIG. 5 shows a schematical view of the fluidized bed in the furnace chamber.

The fluidized bed furnace shown in FIG. 1 has a chamber 1 having a circular bottom member 2, a substantially frusto-conically shaped bottom member 3, a jacket 4 and a cover member 5.

The bottom member 2 is formed as vortex bottom and moreover has a plurality of bores 7 which are arranged on a plurality of imaginary concentric circles 6 and the axes of which define an angle $\alpha$ of 10° to 80° with the plane of the bottom, while the axis projections on the plane of the bottom extend tangentially or by an angle $\beta$ of up to 45° to the bottom centerpoint 8 (FIGS. 2 and 3). Beneath the bottom member 2 is arranged a under-grate blast chamber 9 from which the carrier medium is fed to the vortex bottom.

The upwardly flaring frusto-conical bottom member 3 enclosing the bottom member 2 is formed either as a closed sheet metal jacket or of mutually overlapping spaced apart sheet metal strips 10 directed to the imaginary cone vertex, depending on the mode of the methods to be carried out. The slots between said sheet metal strips 10 are formed as nozzle rows 19 by rows of spacers 11 so that said bottom member 3 represents a vortex bottom ring with which either a separate ring-shaped under-grate blast chamber 12 is associated or which is fed from the blast chamber 9 in common with the bottom member 2. In some processes it may be suitable to form the bottom member 3 only as a vortex bottom ring and to provide the bottom member 2 with vertically extending holes (not shown in the drawings).

The jacket 4 of the furnace chamber has the shape of a conic frustum becoming narrower or tapering upwardly, and up to a height corresponding to the height of the fluidized bed represents a closed sheet metal jacket 13 which, for higher temperatures, may be formed as double-walled jacket having ring guides for the preheating of, for example, combustion air. The upper portion of the jacket 4 is formed of heat exchange registers 14 through which the effluent gas (cracking gas, reaction gas) flows tangentially. For preseparation of dust, the heat exchange registers 14 are surrounded by a chamber 15 with a dust collecting bin 16 and a tangential outlet 17 for the gas. To the gas outlet 17 are usually connected further dust-extracting aggregates such as cyclons or E-filters.

The feed hopper 18 for the goods is disposed centrally in the cover member 5 of the furnace chamber. The charge of liquid goods as a rule takes place with the aid of a unary nozzle, in exceptional cases — with the aid of a binary nozzle. For feeding solids, an injector or a dosing worm is used.

The operation of the furnace takes place as follows:

The carrier medium, i.e. for example hot gas, is blast or sucked from the under-grate blast chambers 9, 12 through the bipartite vortex bottom 2, 3 into the furnace chamber 1. Due to the inclination of the bores 7 and nozzles 19 of the vortex bottom 2, 3, the hot gas assumes the path of a spiral which opens by reason of the centrifugal force, so that the material formed upon the feed of the goods or the previously placed material together with the hot gas establishes a rotating fluidized bed 21. The surface of this fluidized bed 21 represents a sharply defined depression or dip 20 which, neglecting all frictional losses, has the shape of a paraboloid. The lower pressure in said depression 20 produces a reverse flow downwardly, which is entered by the detachments or skeins 22 from the fluidized bed (FIG. 5). The fine grain proportion contained in the fluidized bed is thus not carried out directly upwards but has sufficient sojourn time, due to the rotation and to the reverse flow, to be fully subjected to the desired process.

By feeding a partial stream of cooled down reaction gas, preheated air or cold air into the ring guides of the double-walled chamber jacket 4 it is always possible to achieve temperatures at the periphery of the fluidized bed 21 which are lower than those required for carrying out the process. Even in reactions to be carried out at more than 1,000°C., it is thus possible to operate without a ceramic lines of the chamber 1.

The throughput of the goods can be controlled without problems by way of the sojourn time, the temperature and the charge of goods. The discharge takes place on principle by pneumatic conveying means continuously or also discontinuously.

The dust separation takes place mainly in the chamber 15 behind the heat exchange registers 14. These registers 14 are arranged so that nozzle-like slots facing the chamber 17 are formed so that the reaction gas with the portion of solids is imparted an increase of velocity so as to expand subsequently in the chamber. The dust falls downwards and is extracted at the deepest point via a bucket wheel sluice or a discharge worm 23. The residual dust removal takes place via cyclons or other dust extracting devices connected in series therebehind.

What is claimed is:

1. A method of fluidized bed treatment of solid or liquid goods in a chamber comprising the steps of
   feeding the goods into the chamber from the top thereof;
   introducing a carrier medium into the chamber from the bottom thereof to form a fluidized bed of the goods;
   inducing the carrier medium to flow in a rotary upward flow while forming a strongly pronounced vortex dip in the surface of said fluidized bed, said dip defining a central region within said bed of lower pressure than in the remainder of said bed; and
   discharging the carrier medium with the treated goods above said fluidized bed.

2. An apparatus for fluidized bed treatment comprising
   an upright furnace of round cross-section defining a furnace chamber having a fixed vortex bottom and a top;
   a first inlet means in said bottom for introducing a carrier means into said chamber;
   a second inlet means in said top for introduction of goods to be treated into said chamber to define a fluidized bed with said carrier means;
   a plurality of bores in said bottom disposed in an inclined relation thereto for introducing the carrier means into said chamber to flow in a rotary upward flow path while forming a strongly pronounced vortex dip in the surface of the fluidized bed to define a central region of lower pressure then in the remainder of said bed; and
   an outlet means in an upper region of said furnace for discharging the carrier medium with the treated goods.

3. An apparatus as set forth in claim 1 wherein said bores are arranged on a plurality of imaginary concentric circles, each said bore being disposed at an angle of up to 45° relative to a tangent to a respective circle and at an angle of from 10° to 80° to a horizontal plane disposed in said bottom.

4. An apparatus as set forth in claim 1 wherein said vortex bottom consists of two parts, each part being separately connected to said first inlet means, said parts defining a surface area and a base area of an upwardly flaring conic frustum.

5. An apparatus as set forth in claim 4, wherein said vortex bottom has a portion defining a jacket of said conic frustum, said portion consisting of a plurality of sheet metal strips arranged in overlapped and spaced apart relationship substantially on cone generating lines to define slots between adjacent sheet metal strips, and a plurality of spacers between said strips to define nozzle rows.

6. An apparatus as set forth in claim 5 wherein a plurality of bores extend vertically through said bottom in said base area.

7. An apparatus as set forth in claim 5 having a plurality of bores in said base area arranged on a plurality of imaginary concentric circles, each said bore being disposed at an angle of up to 45° relative to a tangent to a respective circle and at an angle of from 10° to 80° to a horizontal plane disposed in said bottom.

8. An apparatus as set forth in claim 2 wherein said second inlet means is arranged centrally in a cover member of said furnace chamber.

9. An apparatus as set forth in claim 2 wherein said outlet means includes a plurality of heat exchange registers.

10. An apparatus as set forth in claim 2 having a double sheet metal jacket having ring guides for gas preheating in the region of the fluidized bed.

11. An apparatus as set forth in claim 2 having a jacket about said furnace chamber in the shape of an upwardly narrowing conic frustum jacket.

* * * * *